Figure 1:
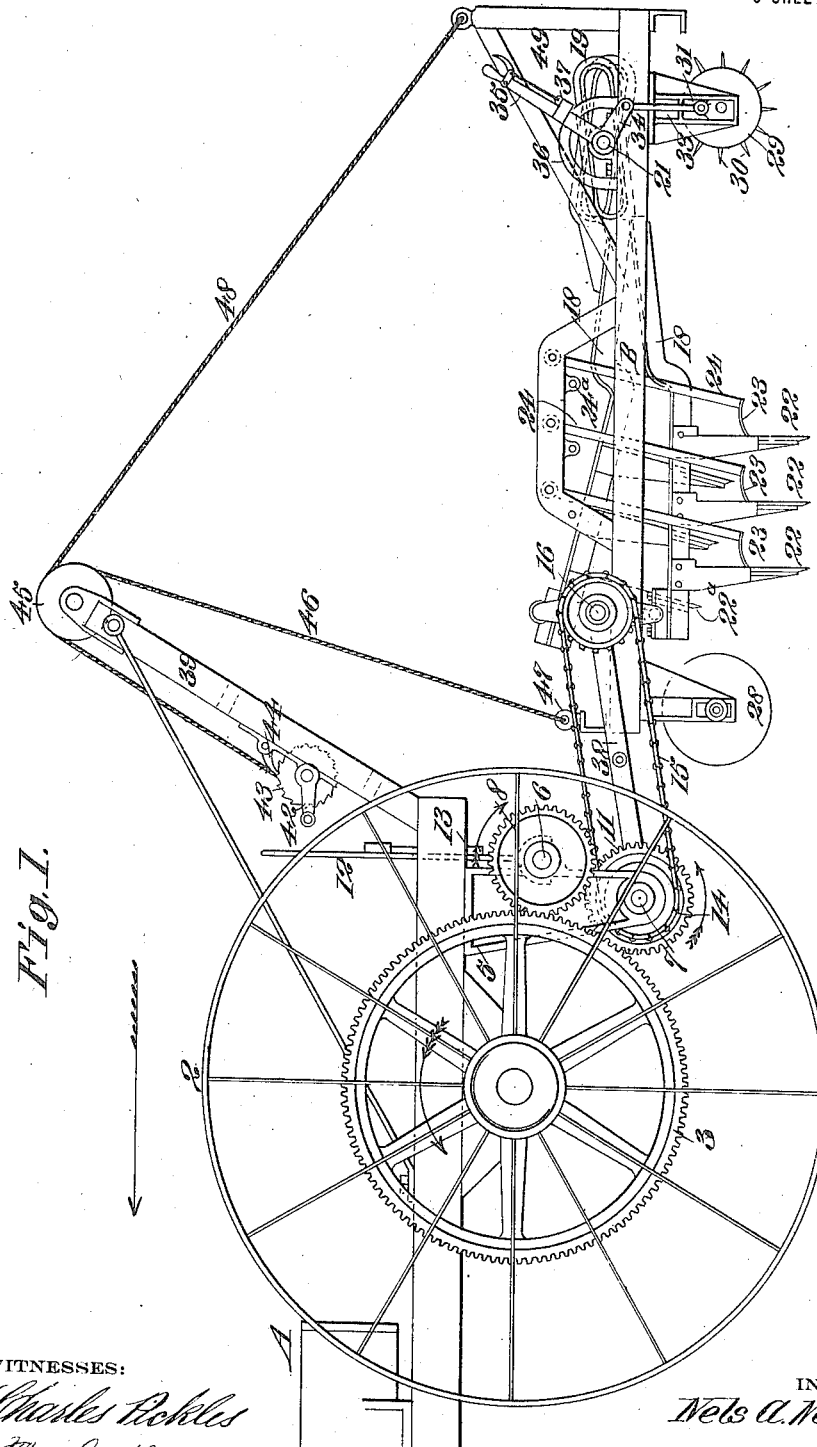

N. A. NELSON.
PLOW.
APPLICATION FILED SEPT. 28, 1914.

1,161,241.

Patented Nov. 23, 1915.
5 SHEETS—SHEET 1.

WITNESSES:
Charles Pickles
Thos Eastberg

INVENTOR
Nels A. Nelson,
BY G. H. Strong
ATTORNEY

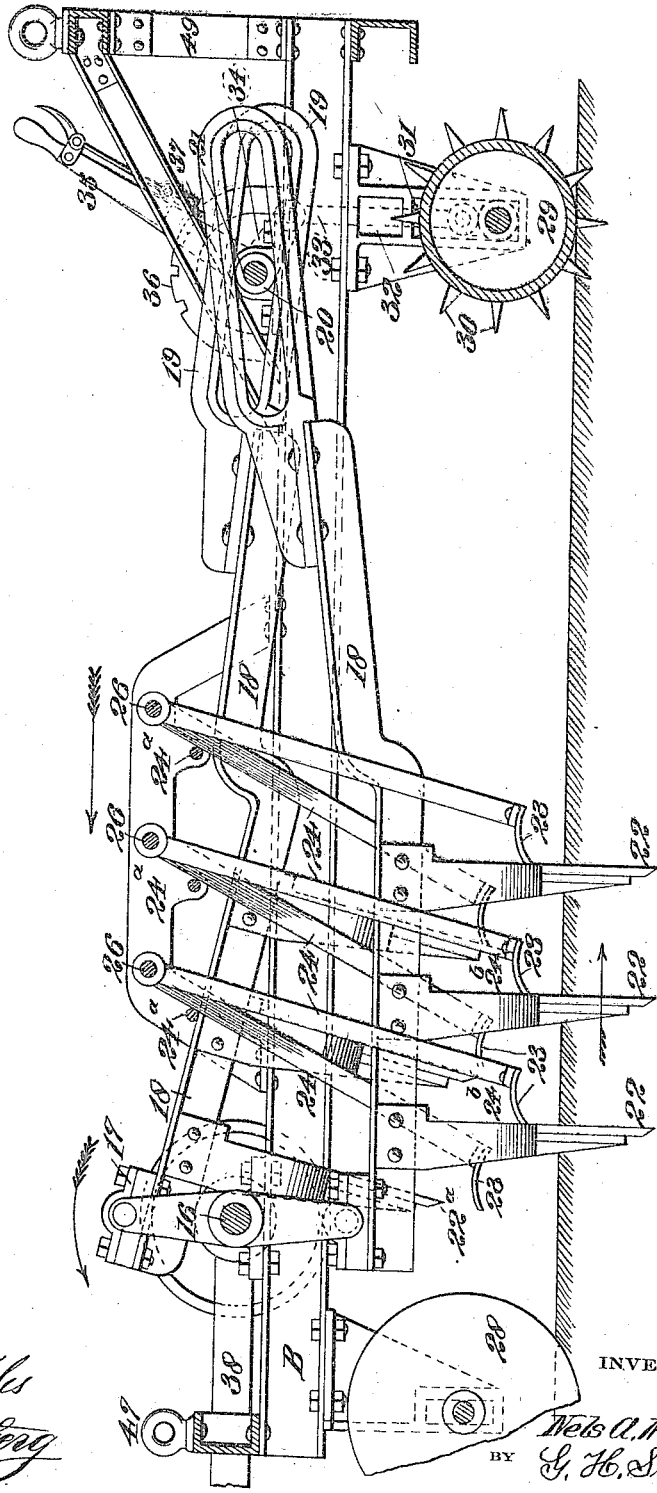

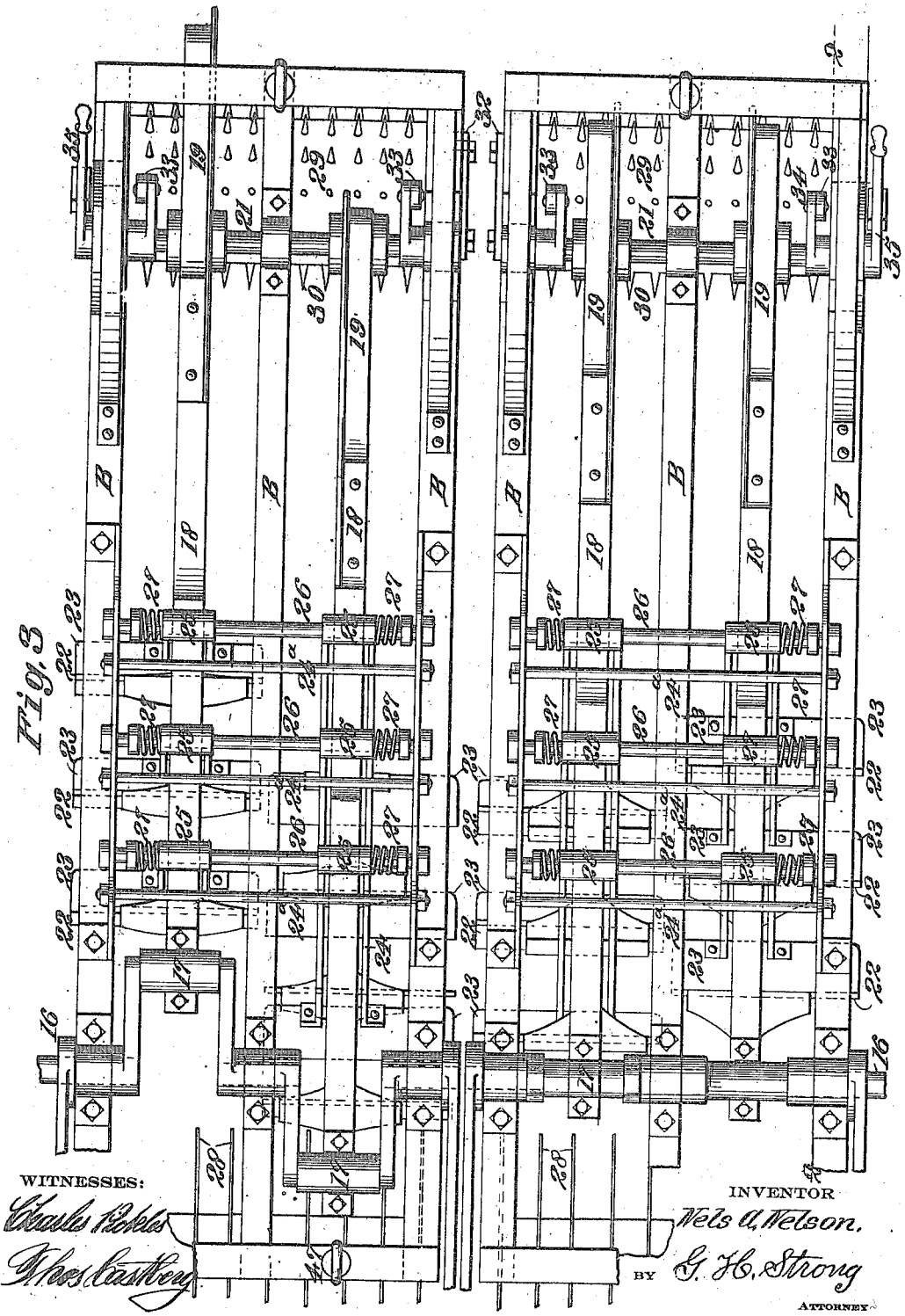

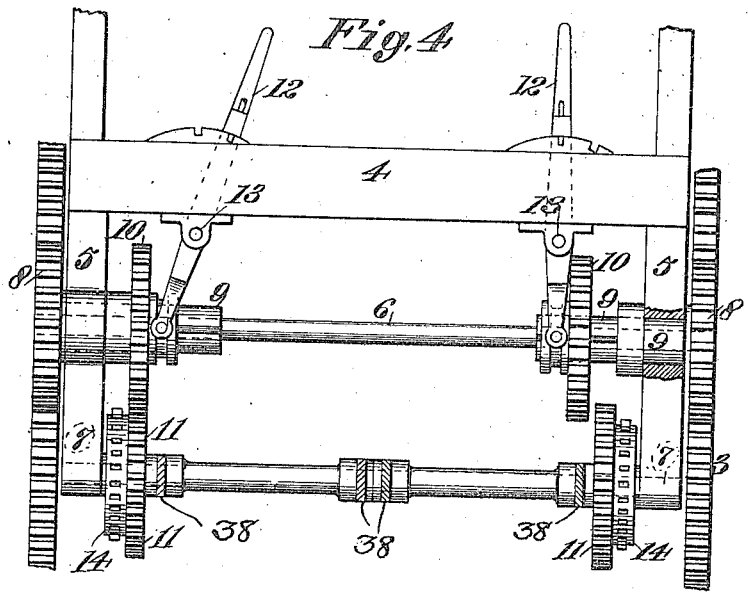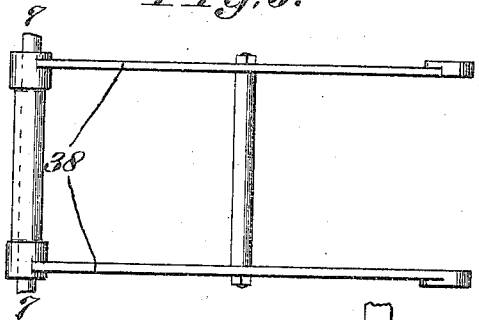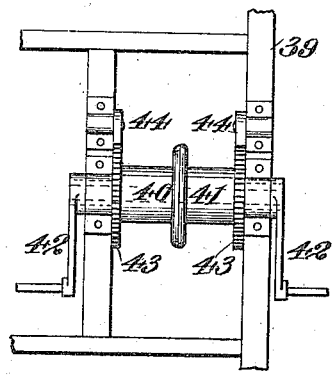

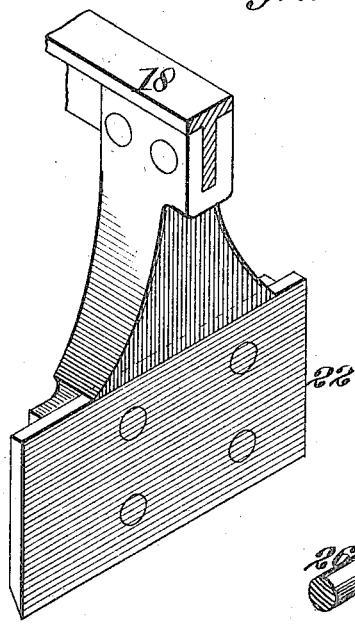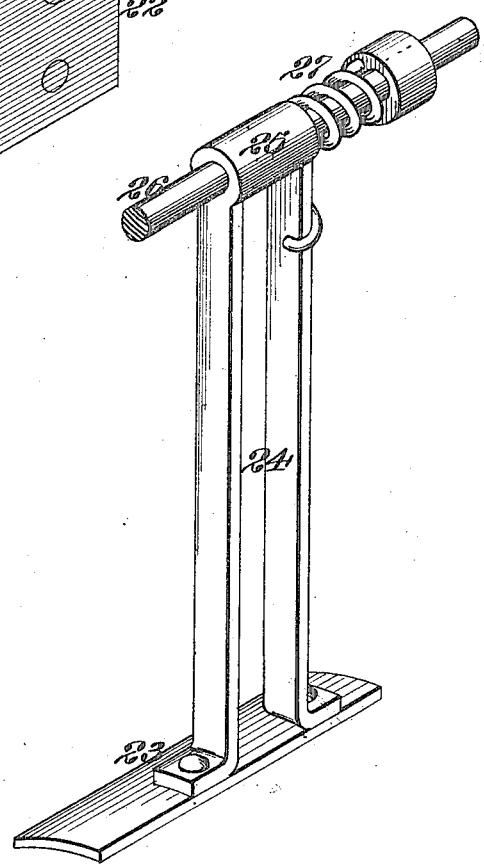

UNITED STATES PATENT OFFICE.

NELS A. NELSON, OF GRAFTON, CALIFORNIA.

PLOW.

1,161,241.  Specification of Letters Patent.  Patented Nov. 23, 1915.

Application filed September 28, 1914. Serial No. 863,880.

*To all whom it may concern:*

Be it known that I, NELS A. NELSON, a citizen of the United States, residing at Grafton, in the county of Yolo and State of California, have invented new and useful Improvements in Plows, of which the following is a specification.

This invention relates to a traction engine gang plow.

It is one of the objects of the present invention to provide a plow of the digger type, which is so constructed that it will more thoroughly turn the soil and break it up as it passes through the ground and which is adapted to be attached to and operated by a tractor of any suitable construction.

Another object of the invention is to provide means for raising and lowering the plow with relation to the ground and the tractor, said raising means being capable of holding the plow clear of the ground when moving from one field to another, and also to regulate or adjust the depth of the furrow.

Further objects will hereinafter appear.

The invention consists of the parts and the construction and combination of parts as hereinafter more fully described and claimed, having reference to the accompanying drawings, in which—

Figure 1 is a side elevation, showing the tractive, driving and suspending connections formed between the tractor and plow. Fig. 2 is a side elevation in section on line 2—2, Fig. 3. Fig. 3 is a plan view of the plow, showing a double unit. Fig. 4 is an end view of the gear transmission. Fig. 5 is a plan view of one of the radius and draft bars. Fig. 6 is an elevation of one of the winch units. Fig. 7 is a perspective view of one of the shovel-like blades. Fig. 8 is a perspective view of one of the scrapers, with connected bifurcated arms.

More particularly described, A indicates the standard type of traction engine which may be driven and operated in any suitable manner, 2 indicates the traction wheels, and 3 a pair of driving gears secured to same. Secured to the rear end of the frame 4 of the tractor is a hanger 5, and mounted in said hanger is a pair of stationary bearing shafts 6 and 7. Intermeshing with each driving gear is an intermediate gear 8. Each gear is secured upon a sleeve 9, on the inner end of which is slidably mounted, on a feather on the sleeve, a secondary intermediate gear 10. These gears are adapted to be thrown into and out of mesh with a pair of gears 11, loosely mounted upon the bearing shaft 7 by means of a lever 12 pivotally mounted, as at 13, on the rear end of frame 4. Formed integrally with, or otherwise secured to, each gear 11 is a sprocket wheel 14 from which power is transmitted through a chain 15 to operate the plow hereinafter to be described.

The plow comprises a main frame B in which is mounted a crank-shaft 16. Connected with said crank, by journals 17, is a pair of plow beams 18, the inner ends of which terminate in yokes 19 which are slidably mounted on rollers 20 carried by a transversely disposed shaft 21 secured on the plow frame B.

Secured on the lower side of each plow beam is a plurality of shovel-like blades 22. Engageable with the rear face of each shovel or blade 22 is a scraper 23 which is secured upon the lower end of a bifurcated arm 24, journaled at its upper end, as at 25, on a stationary cross-rod 26. Surrounding each cross-rod 26 and secured at one end to the cross rod 26 and at the other end to arm 24 is a pair of coil springs 27, the tension of which springs is so directed that it will hold the arms, with connected scraper, in engagement with the rear face of each shovel. The scrapers being yieldingly held against the face of each shovel will follow the shovels in their movement about the crank shaft and are not thrown out of engagement with same until the shovels have been lifted into their uppermost position indicated at 22$^a$, Fig. 2. The scrapers are here prevented from moving forward by means of stops or pins 24$^a$. The downward and backward movement of each shovel will again bring the shovels in engagement with the scrapers and the scrapers will then swing back into the position shown at 24$^b$ against the tension of the springs 27, while the shovels are moving down and back through the ground. The scrapers will thus engage the shovel blades both on the up and down movement and will keep the shovels clean and free from deposits of adhering soil at all times.

Power is transmitted to revolve the crank shaft through the sprocket chain 15. This causes the crank shaft to revolve and will consequently cause the plow beams to move crank-arm-wise about the yokes 19 and rollers 21. The blades or shovels 22 will thus be forced into the ground and will at the same time be pulled backward in the direction of the half feathered arrow. This movement throws the soil backward, turning it completely, and will at the same time cause it to be thoroughly broken up. The gear ratio or drive formed between the main driving gears 3 and the crank shaft 16 is such that the shovels or blades 22 will move backward faster than the tractor is moving ahead. The soil is thus continuously thrown up in a backward direction from the travel of the machine.

Secured to the forward end of the plow frame is a plurality of colter wheels 28. These are provided for the purpose of cutting the ground ahead of the blades or shovels 22 and also to keep the plow from running sidewise with relation to the tractor. Secured to the rear end of the frame is a combined roller and harrow 29. This roller is drum-shaped and provided with a plurality of projecting teeth 30 which are adapted to further break the soil and level it. The roller 29 is mounted in bearings which are vertically adjustable in guideways 31 formed in the hanger 32. The journal boxes of said drum project into the guideways and are connected by links 33 with a crank arm 34 secured upon shaft 21. The shaft is adapted to be turned for the purpose of raising and lowering the drum with relation to the ground surface by means of a lever 35 which may be locked in any suitable position by means of a segment 36 and a grip-operated latch 37.

The plow unit as a whole is connected with the tractor by means of a plurality of draw bars 38 which are secured at one end to the shaft 7 and at the opposite end to extensions formed on the crank shaft 16. The plow unit is adapted to be raised clear of the ground, when moving from one field to another, or may be partly lifted to adjust the depth of the furrow. This is accomplished in the following manner: Suitably secured to the rear end of frame 4 is a crane arm 39, and mounted on said arm is a pair of winches 40 and 41. These winches may be operated in any suitable manner, but are here shown as turned by means of a hand crank 42, and are adapted to be locked by means of a ratchet wheel 43 and pawl 44. Secured to winch 40 and passing over a sheave 45, on the upper end of the crane arm, is a cable 46, the lower end of which is secured to an eye 47, or any other suitable means, on the front end of the plow frame. Similarly secured to winch 41 and passing over a similar sheave is a cable 48 which is secured to a rear stanchion 49 on the plow frame. By turning the winch 40 the front end of the plow frame may be lifted, if desired, or both winches may be turned to lift the entire plow clear of the ground, as indicated in Fig. 1. The radius rods or draw bars 38 hold the driving chain 15 in a taut position at all times and also prevent the plow from swinging inwardly toward the rear end of the tractor. The depth of the furrow may thus be easily regulated by raising or lowering the plow frame, with relation to the ground surface, by means of the cables 46 and 48, or the entire unit may be elevated clear of the ground, as previously described, without interfering with the driving transmission formed between the tractor and plow. The slidable secondary intermediate gears, shown at 10, Fig. 4, permit the transmission to be connected or disconnected at any time.

By referring to Fig. 2 it will be seen that a double unit has been shown. Each of said units is independently raised and lowered by means of a double arrangement of cables 46 and 48 and winches 40 and 41. Each unit is separately driven from gears 11 and sprockets 14, as a double arrangement of same has been provided, as shown in Fig. 4. For instance, one plowing unit may be elevated and the transmission disconnected by sliding gear 10 out of mesh with gear 11, while the other unit may be lowered in position and power transmitted to operate same by sliding its gear 10 into driving position.

A plow constructed as here shown is particularly adapted for working soil where it is necessary to maintain the soil in a pulverized condition. It is easily adjusted to cut different depths of furrows and may be quickly raised or lowered when moving from one place to another.

The materials and finish of the several parts of the plow are such as the experience and judgment of the manufacturer may dictate.

I wish it understood that various changes in form, proportions and minor details of construction may be resorted to within the scope of the appended claims, and I do not wish to limit myself to the specified design and construction here shown.

Having thus described my invention, what I claim and desire to secure by Letters Patent is—

1. In a plow, the combination of a frame, a crank-shaft journaled in said frame, a plurality of plow beams slidably mounted at one end and carried by the crank-shaft at the other end, a plurality of shovel-like blades secured to each beam, means for transmitting rotary movement to the crank-shaft, and scrapers engageable with the rear face of each blade, said scrapers being secured to spring-actuated arms which yieldingly hold the scrapers in engagement with the blades while they are moving.

2. In a plow, the combination of a frame, a crank-shaft journaled in said frame, a plurality of plow beams slidably mounted at one end and carried by the crank-shaft at the other end, a plurality of shovel-like blades secured to each beam, means for transmitting rotary movement to the crank-shaft, scrapers engageable with the rear face of each blade, said scrapers being secured to spring-actuated arms to yieldingly hold the scrapers in engagement with the blades while they are moving, and means for raising or lowering the frame with relation to the ground surface to regulate the depth of the furrow.

3. In a plow, the combination of a frame, a crank-shaft journaled in said frame, a plurality of plow beams terminating in yokes at one end and carried by the crank-shaft at the other end, a bearing shaft, rollers journaled on said shaft on which the yoke ends of the beams are adapted to move back and forth, a plurality of shovel-like blades secured to each beam, a yieldingly supported scraper engageable with the rear face of each blade, and means for transmitting rotary movement to the crank-shaft.

4. In a plow, a frame, a crank shaft journaled in said frame, a plurality of plow beams slidably mounted at one end and connected to the crank shaft at their other end, blades secured to the beams, cross rods supported by the frame, bifurcated arms pivotally connected to the cross rods and straddling the beams, scrapers connected to the arms, means for holding the scrapers in yielding engagement with the blades, and means for simultaneously transmitting movement to the crank shaft and beams.

5. In a plow, a frame, a plow beam thereon, a vertical blade on the beam, a spring pressed pivoted scraper on the frame to one side of the blade and engageable with the blade, crank means to actuate the beam, and means to limit the extent of movement of the scraper whereby to enable the blade upon the end of its up movement to be disengaged from the scraper and reëngaged with the scraper upon its down movement.

6. In a plow, a frame, a spring pressed vertical arm pivoted at its upper end to the frame and having a scraper on its lower end, a stop projecting out from the frame to engage a side of the arm to restrict movement of the latter in one direction, a sliding plow beam, a crank for reciprocating the beam, and a vertical blade on the beam which during its withdrawing movement from the ground is engaged by the scraper.

7. In a plow, a reciprocatory beam having a vertical blade, a scraper arranged to the rear of the blade, means whereby the scraper is caused to engage the blade upon withdrawing movement of the latter from the ground, and means to limit movement of the scraper toward the blade during the remaining movement of the latter.

8. In a plow, a reciprocatory beam having a vertical blade, a spring pressed scraper having a scraping edge presented to the blade at right angles to the latter, and means to restrict the extent of movement of the scraper so as to prevent the latter from engaging the blade during a part of the movement of the blade.

9. In combination with a spading blade, a movable scraper on one side thereof, and means to impart a spading movement to the blade, said scraper being positioned for engagement by the blade on its downward movement and moved thereby to a position adjacent the ground.

In testimony whereof I have hereunto set my hand in the presence of two subscribing witnesses.

NELS A. NELSON.

Witnesses:
IRVINE SINNETT,
W. W. HEALEY.

Copies of this patent may be obtained for five cents each, by addressing the "Commissioner of Patents, Washington, D. C."